Patented Feb. 3, 1931

1,790,807

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

DIRECT-DEVELOPED AZO DYESTUFFS

No Drawing. Application filed March 7, 1929. Serial No. 345,228.

This invention relates to azo dyestuffs and has regard particularly to disazo dyes produced by tetrazotizing an aromatic diamine and coupling therewith a suitable phenolic or arylamine body.

In my pending application Serial No. 278,332, filed May 16, 1928, I have disclosed a method of making azo dyestuffs which consists essentially in tetrazotizing a diamino-diaryl ether, specifically diamino-diphenyl ether, and coupling the resulting tetrazo-compound with suitable residues. The examples given in the aforesaid application comprise certain water-soluble dyestuffs which dye cotton directly. I have now discovered further valuable derivatives related to the type in question, but distinguished therefrom in that the dyes are completely insoluble in water. When such dyes are developed directly on the fibre, the dyed product possesses exceptional depth and clearness of color in various hues or shades of red, depending upon the particular components used for producing the dye, the colors being further characterized by extreme fastness to light and washing. The invention, then, consists of the steps and new products hereinafter fully described and particularly pointed out in the claims, the following description setting forth but several of the various ways in which the principle of the invention may be used.

It is known that azo dyes fast to light and washing are produced by coupling diazotized arylamine compounds with naphthol A S, the latter compound being 2.3-hydroxy-naphthoic acid-anilide. Dyes of related constitution have been likewise produced from benzidine by tetrazotizing the latter and coupling with naphthol A S. In general the dyes so made give colors ranging from scarlet-red to orange, yellow or brown. I have found, however, that when a diamino-diaryl ether is tetrazotized and coupled with naphthol A S, or similar arylides of 2.3 hydroxy-naphthoic acid, dyes of great clearness and brilliance are produced in characteristic shades chiefly of carmine and rose-red.

The dyes of the general type comprised by my invention are constituted according to the following structural formula wherein R, R' and R'' are aryl residues which may also be further substituted in the nucleus;

The procedure for producing or developing these dyes will be described in the following illustrative example, it being understood that similar procedure may be employed equally well for other dyes of the present type.

Cotton material is treated with an alkaline solution of naphthol A S so that the fibres are completely impregnated therewith. A second solution is prepared by dissolving 20 parts diamino-diphenyl ether in dilute hydrochloric acid, adding a solution containing 14 parts sodium nitrite and then adding alkali until the solution is almost neutralized. The previously treated material is then immersed in the second solution in the cold. The dye is developed directly on the fibre, a brilliant clear shade of carmine-red, extremely fast to light and washing.

While a fast dyeing is readily obtained without the aid of mordants, the use thereof is not precluded and may be resorted to without departing from the spirit of the invention. For instance, chrome mordanting produces a distinct color modification in softer and less brilliant shades. Other mordants or combinations thereof may be employed, if desired, such as Turkey red oil, metallic salts and the like, for creating characteristic color tones or for other purposes.

In similar fashion I have prepared other dyes of the same general type, as shown by the accompanying table, wherein the first column gives the particular arylide of 2.3-hydroxy-naphthoic acid coupled with tetrazotized diamino-diphenyl ether and the second column the approximate color shade produced on the dyed material.

| Diamino-diphenyl ether tetrazotized and coupled with 2.3-hydroxy-naphthoic acid arylides from :— | Color |
|---|---|
| Para-nitraniline | Red |
| Meta-nitraniline | Bordeaux |
| Ortho-toluidine | Bordeaux |
| Ortho-amino diphenyl | Carmine |
| 3,4 dichloraniline | Bordeaux |
| Ortho-chlor-para-nitraniline | Orange red |
| Ortho-amino-diphenyl ether | Bordeaux |
| Diphenylamine | Reddish orange |
| Diamino-diphenyl ether | Light bordeaux |
| Ortho-nitro-para-phenetidine | Reddish brown |
| α-naphthylamine | Bordeaux |
| Para-phenetidine | Carmine |

While in the example I have specifically referred to the cotton fibre as the material to be dyed, I may apply these dyes to other textile fibres of vegetable or animal origin, such as silk, or to synthetically prepared fibres, such as rayon or the like.

Likewise I may employ, instead of diamino-diphenyl ether, various nuclear substituted derivatives thereof, as the chlor-, brom-, nitro-, or other substituted derivatives, or I may employ other diamino-diaryl ethers, as, for example, diamino-phenyl-naphthyl-ether, or a substituted derivative thereof.

It is further within the purview of my invention to prepare dyes of the present type in substance, as well as to prepare same in situ on the fibre. That is to say, the respective reaction components may be brought together directly, with or without the aid of a diluting or solvent medium, the dye being separated from the reaction mixture by any suitable means. Owing to the insolubility, stability and fastness to light and water of such dye compounds, they are also valuable for use as pigments.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. As a new product, an azo dyestuff composed of the tetrazotized product of a diamino-diaryl ether coupled with an arylide of 2.3-hydroxy-naphthoic acid.

2. As a new product, an azo dyestuff composed of the tetrazotized product of diamino-diphenyl ether coupled with an arylide of 2.3-hydroxy-naphthoic acid.

3. As a new product, an azo dyestuff composed of the tetrazotized product of diamino-diphenyl ether coupled with 2.3-hydroxy-naphthoic acid-anilide.

4. Material dyed with the dyestuff claimed in claim 1.

5. Material dyed with the dyestuff claimed in claim 2.

6. Material dyed with the dyestuff claimed in claim 3.

Signed by me this 4th day of March, 1929.

ERNEST F. GRETHER.